United States Patent [19]

Hidaka et al.

[11] Patent Number: 4,778,680

[45] Date of Patent: Oct. 18, 1988

[54] LIVESTOCK FEED CONTAINING INULO-OLIGOSACCHARIDES AND BREEDING OF LIVESTOCK BY USING THE SAME

[75] Inventors: Hidemasa Hidaka, Urawa; Toshiaki Eida; Toru Hamaya, both of Chigasaki, all of Japan

[73] Assignee: Meiji Seika Kaisha, Ltd., Tokyo, Japan

[21] Appl. No.: 32,929

[22] Filed: Mar. 27, 1987

Related U.S. Application Data

[63] Continuation of Ser. No. 757,590, Jul. 22, 1985, abandoned.

[30] Foreign Application Priority Data

Jul. 31, 1984 [JP] Japan .................. 59-161680

[51] Int. Cl.$^4$ .................................. A23K 1/00
[52] U.S. Cl. ........................ 426/2; 426/658; 426/807
[58] Field of Search ............ 426/2, 658, 807; 514/54; 536/123; 127/30

[56] References Cited

U.S. PATENT DOCUMENTS

| | | | |
|---|---|---|---|
| 3,338,718 | 8/1967 | Olson | 426/2 |
| 3,898,328 | 8/1975 | Beieler | 514/54 |
| 4,421,852 | 12/1983 | Hoehn et al. | 127/30 |

FOREIGN PATENT DOCUMENTS 0133547 2/1985 European Pat. Off. .
0170026 12/1986 European Pat. Off. .

OTHER PUBLICATIONS

Aumautre et al., "Glucose Syrup with a High Content of Fructose in Feeds for Early Weaning of Piglets" Recherhes Zootechnique (1978) pp. 409–42.

*Primary Examiner*—R. B. Penland
*Attorney, Agent, or Firm*—Frank J. Jordan; C. Bruce Hamburg; Manabu Kanesaka

[57] ABSTRACT

A livestock feed contains, as sugar component, inulooligosaccharides (oligosaccharides consisting of one to five fructose units linked together through $\beta$-1,2 linkage) in an amount of 0.1 to 10.0%. This is effective in markedly reducing scours and loose passage often observed in weaned livestock and poultry and thus promoting their growth.

2 Claims, No Drawings

LIVESTOCK FEED CONTAINING INULO-OLIGOSACCHARIDES AND BREEDING OF LIVESTOCK BY USING THE SAME

This application is a continuation of application Ser. No. 757,590 filed on July 22, 1985, now abandoned.

BACKGROUND OF THE INVENTION

1. Field of the Invention

This invention relates to livestock feed containing sugar composed mainly of inulo-oligosaccharides, and to a method of breeding livestock by using the same, thereby minimizing scours often observed in the weaning period and promoting their growth.

2. Description of the Prior Art

Methods are known in which antibacterial agents are added to livestock feed to lessen scours and loose passage of juvenile animals, or in which large amounts of antibiotics are administered to cure various diseases of livestock. For example, Lactobacillus and *Bacillus bifidus* are admixed (alone or in combination) to livestock feed for the purpose of preventing scours [Japanese Patent Publication No. 47907 (1972); Japanese patent application Laid-open No. 118827 (1976) or suitably treated milk whey is added to livestock feed in order to grow microorganisms living in digestive tracts of animals [Japanese Patent Publication No. 15829 (1979)]. But none of these has proved sufficiently successful.

SUMMARY OF THE INVENTION

This invention relates to livestock feed containing sugar composed mainly of inulo-oligosaccharides, and to a method of breeding livestock by using the same. Inulo-oligosaccharides, which are the main component of the livestock feed of this invention, can be obtained with comparative ease from readily available inulin. The livestock feed of this invention is effective in minimizing scours often observed in the weaning period and hence in promoting their growth.

DETAILED DESCRIPTION OF THE INVENTION

This invention relates to livestock feed containing sugar composed mainly of inulo-oligosaccharides, and to a method of breeding livestock by using the same.

The sugar, composed mainly of inulo-oligosaccharides, used in this invention can be made by partial hydrolysis (by the action of enzyme or with a dilute acid) of inulin found in *Helianthus tuberosa*. This is a proliferating perennial plant widely distributed, and contains much inulin in its rhizoma [T. Makino, "An Illustrated Book of the Japanese Flora", p642 (Hokuryu-kan)]. It is normally used as feed for pigs and other animals, although some new varieties are recently available suitable as food [T. Nagata, "Colored Pictorial Book of Naturalized Plants in Japan", p62 (Hoiku-sha)].

Inulo-oligosaccharides used in the livestock feed of this invention can be easily manufactured on an industrial basis from inulin, a readily available and low-cost material that can be derived from *Helianthus tuberosa* widely distributed over the world.

The inulo-oligosaccharides used in this invention is a mixture of oligosaccharides in which one to five fructose units are combined together through $\beta$-1,2 linkage, and is composed mainly of inulobiose ($F_2$), inulotriose ($F_3$), inulotetrose ($F_4$), inulopentose ($F_5$) and inulohexose ($F_6$). The sugar containing these components is added to an ordinary livestock feed in an amount of 0.1 to 10%, giving the feed of this invention, which is effective, when given to juvenile livestock and poultry, in minimizing scours and loose passage, enhancing body weight gain, and increasing breading efficiency.

The following Examples further illustrate this invention but are not intended to limit its scope.

EXAMPLE 1

Washed rhizoma (100 Kg) of *Helianthus tuberosa* was ground in an attritor, and 400 liters of water was added to make a suspension of 20% solid content. Oxalic acid was added to a final concentration of 0.1N, and the mixture was heated at 60° C. for one hour to effect hydrolysis. After neutralization with calcium carbonate and separation with a centrifuge (or filtration through a filter press), the supernatant (or filtrate) was concentrated and dried, yielding 8.2 Kg of powder. The inulo-oligosaccharides thus obtained was composed mainly of $F_2$ to $F_6$, as shown in Table 2.

TABLE 2

| Composition of Hydrolyzate of *Helianthus Tuberosa* (%) | | | | | | |
|---|---|---|---|---|---|---|
| | G,F | $F_2$ | $F_3$ | $F_4$ | $F_5$ | $F_6$ | $F_7$ |
| Hydrolyzate | 33.2 | 19.2 | 13.0 | 9.8 | 7.8 | 5.6 | 11.4 |

The livestock feed of this invention can be obtained by adding, to ordinary animal feed, the sugar prepared above in an amount of 0.1 to 10%.

The livestock feed thus obtained may be applied in the same manner as ordinary livestock feed, and is effective in minimizing scours and other troubles encountered in the weaning period of juvenile livestock and poultry and in promoting their growth.

(Example of application)

In order to ensure livestock breeding with higher efficiency, it is not rare to replace breast feeding by bottle feeding about one month after birth, but this often brings about scours or loose passage, resulting in incomplete development, temporary decrease in body weight, susceptibility to diseases, and even death. Once young livestock fall in this condition, it takes much time to restore normal state and their body weight continues to be lower. Hence improper action in this period often leads to much economic loss. Table 3 through 5 shown below show the results of tests in which the livestock feed of this invention was freely given to piglings, calves and chickens.

TABLE 3

| | Pigling Breeding Test | | |
|---|---|---|---|
| Amt. of sugars containing. inulo-oligosaccharide (%) | Body weight gain (Relative value) | Feed conversion (Relative value) | Scours, loose Passage |
| Control | 100 | 100 | Marked |
| (*Helianthus tuberosa*) | | | |
| 0.1 | 112 | 96 | Little |
| 0.5 | 129 | 85 | Very little |
| 1.0 | 132 | 80 | " |

TABLE 3-continued

| | Pigling Breeding Test | | |
|---|---|---|---|
| Amt. of sugars containing. inulo-oligosaccharide (%) | Body weight gain (Relative value) | Feed conversion (Relative value) | Scours, loose Passage |
| 5.0 | 125 | 83 | " |
| 10.0 | 123 | 82 | " |

TABLE 4

| | Calf Breeding Test | | |
|---|---|---|---|
| Amt. of sugars containing. inulo-oligosaccharide (%) | Body weight gain (Relative value) | Feed conversion (Relative value) | Scours, loose Passage |
| None | 100 | 100 | Marked |
| 0.1 | 105 | 97 | Slight |
| 0.5 | 113 | 91 | Little |
| 1.0 | 122 | 87 | Very little |
| 5.0 | 125 | 83 | " |
| 10.0 | 124 | 88 | " |

TABLE 5

| | Chicken Breeding Test | |
|---|---|---|
| Amt. of sugars containing. inulo-oligosaccharide (%) | Body weight gain (Relative value) | Feed conversion (Relative value) |
| None | 100 | 100 |
| 0.1 | 103 | 98 |
| 0.2 | 105 | 97 |
| 0.5 | 113 | 93 |
| 1.0 | 107 | 95 |

As may be apparent from the tables, the test group (with inulo-oligosaccharides added) showed higher weight gain and lower feed conversion than the control group in all the cases tested (piglings, calves and chickens). When consideration is given also to economy, the preferable amount of sugar composed mainly of inulo-oligosaccharides would be about 1.0% for piglings and calves and about 0.5% for chickens. The test group proved very effective also in lessening scours and loose passage. This is probably be ascribable to favorable effects exerted by the inulo-oligosaccharides upon useful bacteria living in the intestine of livestock and poultry.

EXAMPLE 2

21-Day piglings were divided into one control group and five test groups, each consisting of eight head, and feeding test was conducted over a period of 30 days. Commercial feed for weaned piglings plus powder of *Helianthus tuberosa* was used for the control group. For the test groups, on the other hand, the feed of this invention prepared in Example 1 was added, in place of powder of *Helianthus tuberosa*, in amounts of 0.1, 0.5, 1.0, 5.0 and 10%. The feed and water were freely ingested bY the test animals, and the body weight gain was measured after the test.

The amount of feed taken by each head was collected, and the feed conversion was calculated from these data. Check was made every day throughout the test period for the occurence of scours and loose passage, as well as other health conditions. It was demonstrated that the gain in body weight in the test group was 1.12 to 1.32 times as much as that of the control group, and the feed request rate was 96 to 80%. Marked scours and loose passages were observed in the control group, but the rate of occurrence was only 2 to 3% for the test group.

EXAMPLE 3

Calves (2 to 4 weeks old) were divided into one control group and five test groups, each consisting of five head, and breeding test was conducted over a period of 60 days. Commercial milk substitute for weaned calves was used for the control group. For the test group, on the other hand, the sugar of this invention was added to the above milk substitute in amounts of 0.1, 0.5, 1.0, 5.0 and 10.0%, and the feed was given to each head once every day using separate containers.

The body weight gain was 1.05 to 1.25 times larger in the test group, while the feed conversion rate was 97 to 83%. Scours and loose passage were markedly reduced in the test groups to which feed containing 1.0% and more inulo-oligosaccharides were given. the test groups to which feed containing 1.0% and more inulo-oligosaccharides were given.

EXAMPLE 4

4-Day male chickens were divided into one control group and four test groups (each group consisting of 30 chickens), and breeding test was conducted over a period of 30 days. Commercial chicken feed was used for the control group. For the test group, on the other hand, the sugar of this invention was added to that commercial feed in amounts of 0.1, 0.5, 1.0 and 5.0%. The other conditions were the same as in Example 2. The gain in body weight was 1.03 to 1.13 times larger in the test group, while the feed request rate was 98 to 93%.

What is claimed is:

1. A method of breeding livestock by minimizing scours in a weaning period of livestock, comprising feeding livestock with an animal feed containing 0.1 to 10% inulo-oligosaccharides having one to five fructose units combined through beta-1,2 linkages, said inulo-oligosaccharides being mainly formed of inulobiose, inulotriose, inulotetrose, inulopentose and inulohexose.

2. A method according to claim 1, wherein said animal feed is selected from the group consisting of feed for piglets, calves and chickens.

* * * * *